United States Patent
Methvin

(10) Patent No.: US 11,888,754 B2
(45) Date of Patent: Jan. 30, 2024

(54) TECHNIQUES FOR TRANSMITTING MESSAGES SUBJECT TO MULTIPLE RATE LIMITS

(71) Applicant: Iterable, Inc., San Francisco, CA (US)

(72) Inventor: Gregory M. Methvin, San Francisco, CA (US)

(73) Assignee: ITERABLE, INC., San Francisco, CA (US)

( * ) Notice: Subject to any disclaimer, the term of this patent is extended or adjusted under 35 U.S.C. 154(b) by 171 days.

(21) Appl. No.: 17/505,446

(22) Filed: Oct. 19, 2021

(65) Prior Publication Data

US 2023/0123232 A1    Apr. 20, 2023

(51) Int. Cl.
*H04L 47/62* (2022.01)
*H04L 49/90* (2022.01)

(52) U.S. Cl.
CPC .............. *H04L 47/62* (2013.01); *H04L 49/90* (2013.01)

(58) Field of Classification Search
CPC ................................. H04L 47/62; H04L 49/90
See application file for complete search history.

(56) References Cited

U.S. PATENT DOCUMENTS

| | | |
|---|---|---|
| 2013/0129068 A1 | 5/2013 | Lawson et al. |
| 2015/0067069 A1 | 3/2015 | Gourevitch et al. |
| 2019/0273693 A1* | 9/2019 | Deval ..................... H04L 47/60 |
| 2020/0409763 A1* | 12/2020 | Bischel .................. H04L 67/61 |

OTHER PUBLICATIONS

Nataraj Srikantaiah, "Understanding Rate Limiting Algorithms", https://www.quinbay.com/blog/understanding-rate-limiting-algorithms, Dec. 28, 2020, 6 pages.
International Search Report for Application No. PCT/US2022/078229 dated Jan. 20, 2023.

* cited by examiner

*Primary Examiner* — Siming Liu
(74) *Attorney, Agent, or Firm* — Artegis Law Group, LLP

(57) ABSTRACT

Techniques are disclosed for transmitting electronic messages subject to multiple rate limits. In some embodiments, a send-side rate limiter employs a sliding log or other rate limiting technique to determine whether requests to transmit messages comply with rate limits associated with those messages. When the transmission of a message does not comply with associated rate limits, a negative acknowledgment message is sent to a queuing system, causing the message to be reinserted into a queue for later transmission. In addition, delivery rate limits are established for each queue in the queuing system to throttle the delivery of messages to a send service that makes requests to transmit messages to the send-side rate limiter.

20 Claims, 6 Drawing Sheets

TECHNIQUES FOR TRANSMITTING MESSAGES SUBJECT TO MULTIPLE RATE LIMITS

BACKGROUND

Technical Field

Embodiments of the present disclosure relate generally to computer science and computer networks and, more specifically, to techniques for transmitting messages subject to multiple rate limits.

Description of the Related Art

Automated message campaigns send electronic messages, such as emails, text messages, or the like, to a large numbers of users, typically in a short period of time. The sender of messages in a message campaign may need to throttle the rate at which messages are transmitted for various reasons. For example, the transmission of each message could require accessing a server that provides information to include in the message. In such a case, the rate at which messages are transmitted can be limited to prevent the server from being overwhelmed with access requests. As another example, the rate at which messages of a message campaign are transmitted can be limited based on a quota for a customer that initiated the message campaign. As further examples, the rate at which messages of a message campaign are transmitted can be limited based on a type of the messages or a limit for that message campaign.

Oftentimes, multiple rate limits need to be applied simultaneously to the messages of a message campaign. Further, each rate limit can be applicable to a different subset of message campaigns. In the example of accessing the server that provides information to include in messages, a rate limit associated with the server could be applicable to multiple message campaigns that need to access the server. In the example of the customer quota, a rate limit associated with the quota could be applicable to multiple message campaigns initiated by the customer. In the example of the rate limit for a message type, the rate limit could be applicable to multiple message campaigns that send that type of message.

Conventional techniques for transmitting messages permit a single rate limit to be applied to messages being transmitted. As a general matter, a single rate limit cannot be applied to implement multiple rate limits that are associated with a message campaign without excessively limiting the rate at which messages are transmitted. For example, the single rate limit could be set to a lowest of the multiple rate limits. However, in such cases, computing resources that could otherwise be used to transmit messages of the message campaign may not be efficiently utilized to transmit those messages.

As the foregoing illustrates, what is needed in the art are techniques for transmitting messages subject to multiple rate limits.

SUMMARY

One embodiment provides a computer-implemented method for transmitting messages. The method includes storing a plurality of messages in a queue. The method further includes retrieving, based on a rate limit associated with the queue, one or more messages included in the plurality of messages from the queue. In addition, the method includes transmitting the one or more messages based on a plurality of rate limits associated with the one or more messages.

Further embodiments include non-transitory computer-readable storage media storing instructions that, when executed by a computer system, cause the computer system to perform the methods set forth above, and computer systems programmed to carry out the methods set forth above.

One advantage of the techniques disclosed herein is that the disclosed techniques throttle the transmission of electronic messages based on multiple rate limits that can be applicable to different subsets of message campaigns. The disclosed techniques do not excessively limit the rate at which messages are transmitted. As a result, computing resources are utilized relatively efficiently for transmitting messages. In addition, the disclosed techniques establish delivery rate limits for message queues in a queuing system to avoid overwhelming both a send-side rate limiter that determines whether the transmission of messages complies with rate limits associated with those messages and the queuing system, itself. These technical advantages represent one or more technological improvements over prior art approaches.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present disclosure. However, it will be apparent to one of skilled in the art that the present disclosure may be practiced without one or more of these specific details.

System Overview

Figure 1:
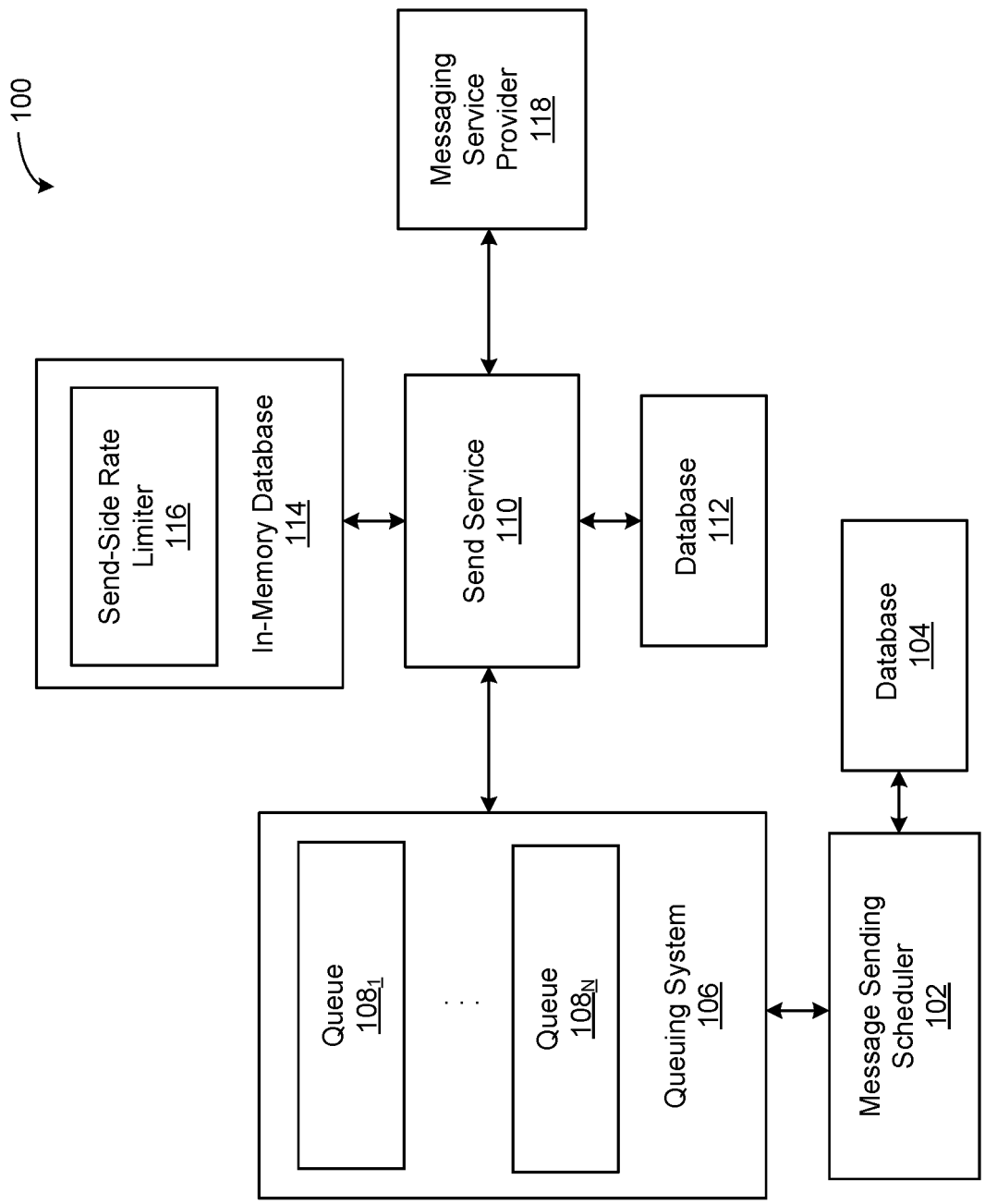
FIG. 1 is a conceptual illustration of a system configured to implement one or more embodiments.

FIG. 1 is a conceptual illustration of a system 100 configured to implement one or more embodiments. As shown, the system 100 includes, without limitation, a message sending scheduler 102, a queuing system 106, a send service 110, an in-memory database 114, a messaging service provider 118, and two databases 104 and 112. The queuing system 106 implements a publish-subscribe pattern that permits send services, such as the send service 110, to subscribe to receive messages stored in a number of queues $108_{1-N}$ (referred to herein collectively as queues 108 and individually as a queue 108). For example, in some embodiments, the queuing system 106 can be an Apache Pulsar messaging platform, which allows publishers to publish messages to topics that subscribers can subscribe to. In alternative embodiments, other types of queuing systems 106 can be used. Each queue 108 stores an ordered set of messages for a different marketing campaign. In some embodiments, each message stored in a queue 103 represents a task to perform, such as sending a text message (e.g., a SMS message), an email, an in-application notification, a push notification, a web push notification, or the like, to a user.

When a message campaign is scheduled to launch, the message sending scheduler 102 enqueues messages into a queue 108 of the queuing system 106. In some embodiments, the message sending scheduler 102 queries the database 104 for users that are relevant to the message campaign. Then, for each user, the message sending scheduler 102 transmits a message to the queuing system 106 that indicates the task of publishing messages for that user. The published messages are then stored in a queue 108 and delivered to the send service 110, which renders the messages (e.g., as an email, text message, etc. that includes content) for transmission. In some embodiments, the message send scheduler 102 sets a rate limit for the queue 108, which is also referred to herein as a "delivery rate limit." The delivery rate limit throttles the delivery of messages stored in the queue to the send service 110 that consumes (i.e., retrieves) those messages. As discussed in greater detail below, the delivery rate limit can be set to a lowest rate limit associated with the messages stored in the queue 108, or to a predefined rate limit that is at least the lowest rate, in some embodiments.

The send service 110 subscribes to receive messages from one or more queues 108 that are published by the queuing system 106. The send service 110 renders the received messages and sends the rendered messages to the messaging service provider 118 for transmission. In some embodiments, the rendered messages can include text messages, emails, in-application notifications, push notifications, web push notifications, or the like. Further, the rendered messages can include any suitable content. During the rendering of a message, the send service 110 can retrieve information from one or more data sources to include in the message. For example, the send service 110 could call an endpoint on a server (the data source) that provides user-specific product preferences. Then, the send service 110 can add those product preferences to a message being rendered. A data source from which information is retrieved is also referred to herein as a "data feed." Each data feed can be associated with a rate limit indicating how frequently the data source can be accessed. The rate limit is used to prevent server(s) associated with the data feed from being overwhelming with access requests. Additional rate limits can be applied to messages in a message campaign based on a type of the messages, a quota on the number of messages a customer can send, and/or a rate limit for the message campaign, among other things. For example, a rate limit could be set for a type of message that includes links to a website, or requires customer support when a user responds to the type of message, in order to avoid excessive load on the website and/or other resources. More generally, any technically feasible rate limits can be associated with messages of a message campaign in some embodiments. In addition, each rate limit can be applicable to one or more message campaigns.

The in-memory database 114 is a database management system that relies primarily on memory for data storage, permitting the in-memory database 114 to execute a send-side rate limiter 116 relatively efficiently. The send-side rate limiter 116 can be implemented in any technically feasible manner. For example, in some embodiments, the send-side rate limiter 116 can be implemented via a script (e.g., a Lua script) that is executed by the in-memory database 114. Although described herein primarily with respect to the in-memory database 114, the send-side rate limiter 116 can be implemented without requiring the in-memory database 114 in some embodiments. In some embodiments, the send service 110 requests, from the send-side rate limiter 116, permission to transmit each message of a message campaign that is received from the queuing system 106. In such cases, the send-side rate limiter 116 responds by permitting or rejecting the request, depending on whether transmission of the message complies with rate limits associated with the message. In some embodiments, the rate limits can be determined based on information for the message campaign that is retrieved from the database 112 and passed as arguments to the in-memory database 114. For example, the database 112 could be a relational database that stores information related to message campaigns, such as various rate limits and message campaigns that the rate limits are applicable to, which can be input by a user via, e.g., a user interface. If the send-side rate limiter 116 permits a message to be transmitted, then the send service 110 renders the message and sends the rendered message to the messaging service provider 118 for transmission to a user. Alternatively, if the send-side rate limiter 116 rejects the transmission of a message, then the send service 110 sends a negative acknowledgment message to the queuing system 106, which causes the queuing system 106 to reinsert the message into the queue 108 for later transmission.

The messaging service provider 118 transmits electronic messages to endpoints. In some embodiments, the messaging service provider 118 receives rendered messages from the send service 110 and transmits the rendered messages. For example, in the case of email messages, the messaging service provider 118 could be an email service provider (ESP).

Figure 2:
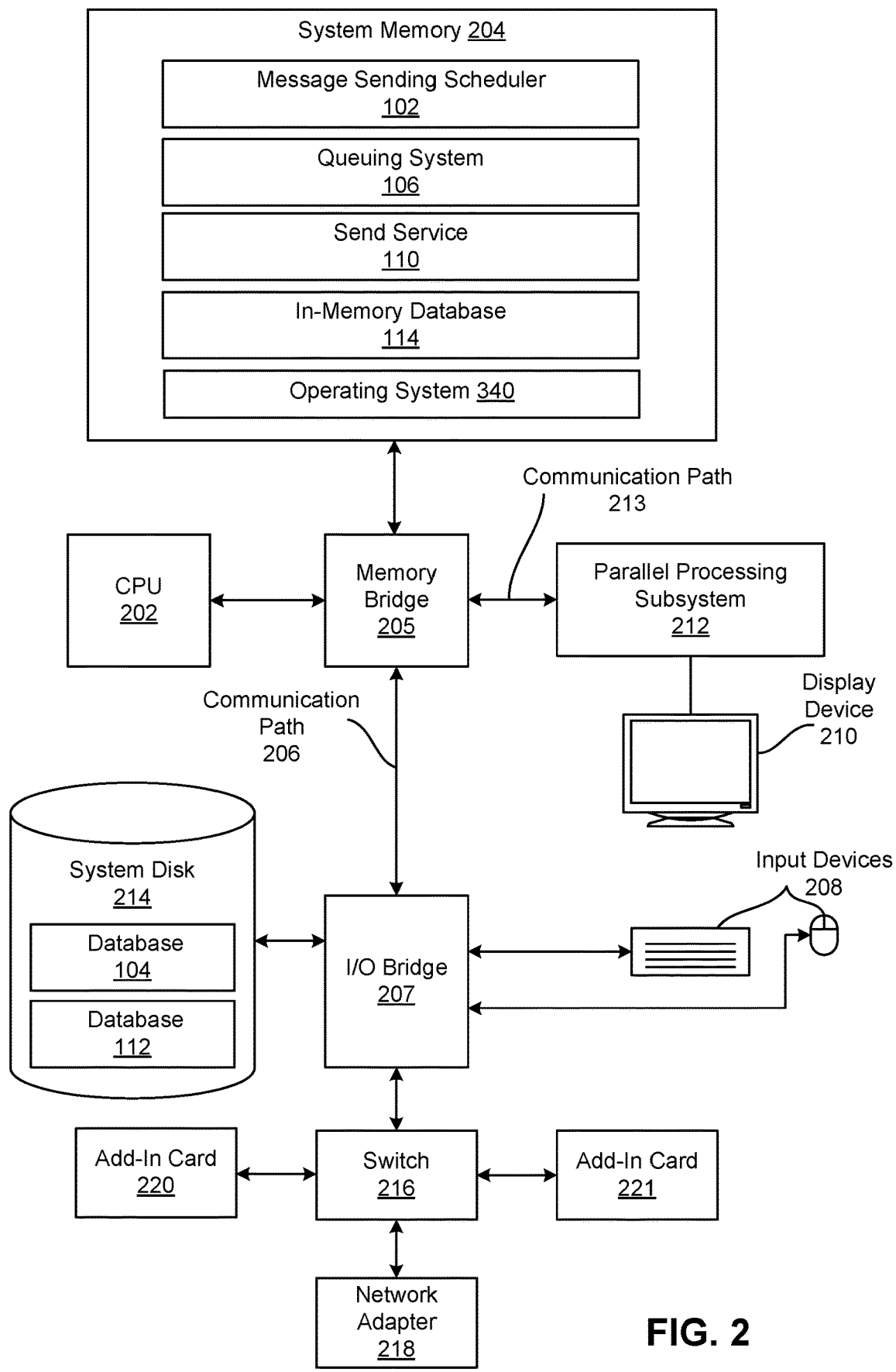
FIG. 2 illustrates an exemplar computing system, according to various embodiments.

FIG. 2 illustrates a computing device 200, according to one or more embodiments. As shown, the computing device 200 includes, without limitation, a central processing unit (CPU) 202 and a system memory 204 coupled to a parallel processing subsystem 212 via a memory bridge 205 and a communication path 213. The memory bridge 204 is further coupled to an I/O (input/output) bridge 207 via a communication path 206, and the I/O bridge 207 is, in turn, coupled to a switch 216.

In operation, the I/O bridge 207 is configured to receive user input information from input devices 208, such as a keyboard or a mouse, and forward the input information to the CPU 202 for processing via the communication path 106 and the memory bridge 205. The switch 216 is configured to provide connections between the I/O bridge 207 and other components of the computer system 200, such as a network adapter 218 and various add-in cards 220 and 221.

As also shown, the I/O bridge 207 is coupled to a system disk 214 that may be configured to store content and applications and data for use by CPU 202 and parallel processing subsystem 212. As a general matter, the system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Illustratively, the system disk 214 stores the databases 104 and 112. In some embodiments, one or both of the databases 104 and 112 can be stored elsewhere, such as in other storage device(s) or across multiple computing devices. Finally, although not explicitly shown, other components, such as universal serial bus or other port connections, compact disc drives, digital versatile disc drives, film recording devices, and the like, may be connected to the I/O bridge 207 as well.

In various embodiments, the memory bridge 205 may be a Northbridge chip, and the I/O bridge 207 may be a Southbridge chip. In addition, communication paths 206 and 213, as well as other communication paths within the client device 102, may be implemented using any technically suitable protocols, including, without limitation, AGP (Accelerated Graphics Port), HyperTransport, or any other bus or point-to-point communication protocol known in the art.

In some embodiments, the parallel processing subsystem 212 comprises a graphics subsystem that delivers pixels to a display device 210 that may be any conventional cathode ray tube, liquid crystal display, light-emitting diode display, or the like. In such embodiments, the parallel processing subsystem 212 incorporates circuitry optimized for graphics and video processing, including, for example, video output circuitry. Such circuitry may be incorporated across one or more parallel processing units (PPUs) included within the parallel processing subsystem 212. In other embodiments, the parallel processing subsystem 212 incorporates circuitry optimized for general purpose and/or compute processing. Again, such circuitry may be incorporated across one or more PPUs included within the parallel processing subsystem 212 that are configured to perform such general purpose and/or compute operations. In yet other embodiments, the one or more PPUs included within the parallel processing subsystem 212 may be configured to perform graphics processing, general purpose processing, and compute processing operations. The system memory 104 includes at least one device driver 103 configured to manage the processing operations of the one or more PPUs within the parallel processing subsystem 212.

In various embodiments, the parallel processing subsystem 212 may be integrated with one or more of the other elements of FIG. 2 to form a single system. For example, the parallel processing subsystem 212 may be integrated with the CPU 202 and other connection circuitry on a single chip to form a system on chip (SoC).

It will be appreciated that the system shown herein is illustrative and that variations and modifications are possible. The connection topology, including the number and arrangement of bridges, the number of CPUs, and the number of parallel processing subsystems, may be modified as desired. For example, in some embodiments, the system memory 204 could be connected to CPU 202 directly rather than through memory bridge 205, and other devices would communicate with the system memory 204 via the memory bridge 205 and the CPU 202. In other alternative topologies, the parallel processing subsystem 212 may be connected to the I/O bridge 207 or directly to the CPU 202, rather than to the memory bridge 205. In still other embodiments, the I/O bridge 207 and the memory bridge 205 may be integrated into a single chip instead of existing as one or more discrete devices. Lastly, in certain embodiments, one or more components shown in FIG. 2 may not be present. For example, the switch 216 could be eliminated, and the network adapter 218 and add-in cards 220, 221 would connect directly to the I/O bridge 207.

Illustratively, the system memory 204 stores the message sending scheduler 102, the queuing system 106, the send service 110, the in-memory database 114, and the messaging service provider 118. In addition, the system memory 216 stores an operating system 240 which can be, e.g., Linux® or Microsoft Windows®. In other embodiments, functionality of the message sending scheduler 102, the queuing system 106, the send service 110, the in-memory database 114, and/or the messaging service provider 118 can be distributed across any number of pieces of software that run in any technically feasible manner on any number of computing systems. For example, multiple instances of the send service 110 that subscribe to receive messages from the queuing system 106 could be deployed in virtualized environments, such as containers. As another example, any or all of the message sending scheduler 102, the queuing system 106, the send service 110, the in-memory database 114, and the messaging service provider 118 could be implemented in a cloud computing environment or a distributed computing environment, rather than on a single computing system.

In alternate embodiments, the system 100 may include any amount of memory 204, and any number of processors 202 that are implemented in any technically feasible fashion. Further, the memory 204 and the processor 202 may be implemented via any number of physical resources located in any number of physical locations. For example, the memory 204 and the processor 202 could be included in one or more computing systems that provide a cloud computing environment or a distributed computing environment. The connection topology between the various units in FIGS. 1 and 2 may also be modified as desired.

Transmitting Messages Based on Multiple Rate Limits

Figure 3:
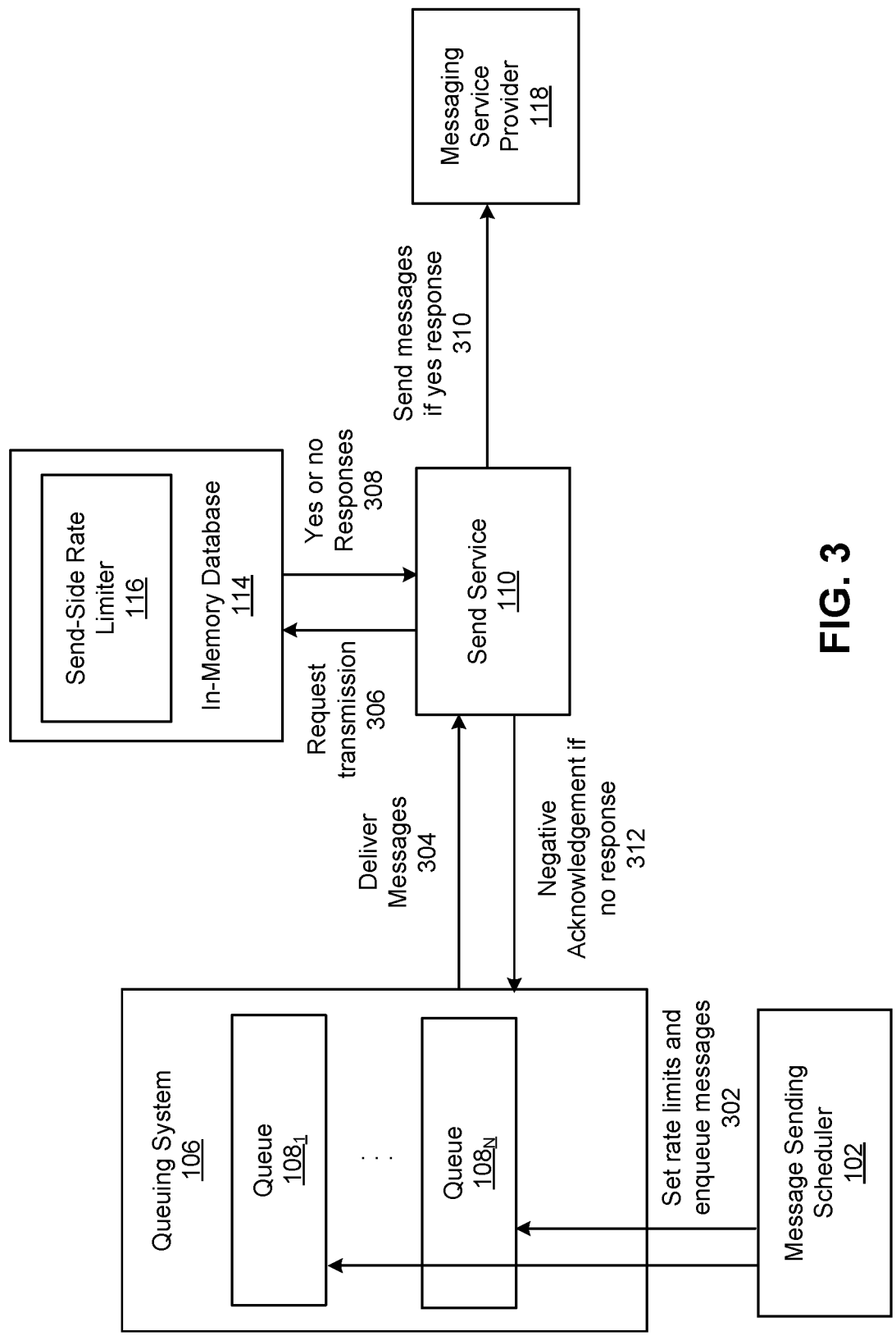
FIG. 3 illustrates an approach for transmitting messages based on multiple rate limits, according to various embodiments.

FIG. 3 illustrates an approach for transmitting messages based on multiple rate limits, according to various embodiments. As shown at 302, the message sending scheduler 102 sets the delivery rate limits for queues 108 in the queuing system 106 and enqueues those queues 108 with messages. As described, the delivery rate limits throttle the delivery of messages stored in the queues 108 to the send service 110 that consumes (i.e., retrieves) those messages. In some embodiments, the delivery rate limit for a given queue 108 is set, and messages are enqueued in the queue 108, when a corresponding message campaign is scheduled to be launched. As described, the message campaign, and messages of the message campaign, can be associated with any number of rate limits, such as data feed rate limits, a rate limit based on a type of message in the message campaign, a rate limit for the message campaign, and/or a rate limit based on a customer quota, and each rate limit can be applicable to one or more message campaigns.

In some embodiments, the delivery rate limit for each queue 108 is set to a lowest rate limit associated with messages that are stored in the queue 108. In some other embodiments, the delivery rate limit for each queue 108 can be set to a predefined rate limit that is at least the lowest rate limit associated with messages that are stored in the queue 108. For example, the predefined rate limit could be a rate limit that is higher than the lowest rate limits for all of the queues 108. Using the lowest rate limit will generally result in the fewest rejections of requests from the send-side rate limiter 116 that require negative acknowledgment messages to be sent back to the queuing system 106, discussed in greater detail below. However, when the lowest rate limit is different for different queues 108, some queues 108 can deliver messages faster than other queues 108 and consume a larger proportion of a shared rate limit. To achieve a fairer distribution of the shared rate limit, the delivery rates limit for each queue 108 can be set to the same predefined rate limit.

Illustratively, at 306, the send service 110 makes, to the send-side rate limiter 116, a request to transmit each message that is received from the queuing system 106. In some embodiments, the send-side rate limiter 116 implements a sliding log or other rate limiting technique, discussed in greater detail below, to determine whether transmitting a message complies with all of the rate limits associated with that message. In such cases, the send-side rate limiter 116 returns to the send service 110 either a yes response, indicating that the request to transmit a message is permitted because the transmission complies with rate limits associated with the message, or a no response, indicating that the request to transmit the message is rejected because the transmission does not comply with rate limits associated with the message. If the send-side rate limiter 116 returns a no response, then the send service 110 sends a negative acknowledgment message back to the queuing system 106 at 312. Upon receiving the negative acknowledgment message, the queuing system 106 reinserts the message back into the queue 108. Advantageously, the delivery rate limits that are set for each queue 108 prevent too many messages from being delivered too quickly to the send service 110 because, without the delivery rate limits, the queuing system 106 can deliver messages as quickly as possible to the send service 108. Delivering too many messages too quickly can result in the send service 110 making repeated requests to the send-side rate limiter 116 that result in no responses and require negative acknowledgment messages to be sent back to the queuing system 106. Accordingly, the delivery rate limits improve the efficiency of the system 100, because the send-side rate limiter 116 is not overwhelmed with requests, and the send service 110 sends fewer negative acknowledgment messages to the queuing system 106 that cause messages to be reinserted into queues 108.

The send-side rate limiter 116 ensures that the transmission of each message complies with all of the rate limits associated with the message. In some embodiments, the send-side rate limiter 116 implements a sliding log technique in which requests are added to a log when the log includes fewer than a predefined number of requests, and logged requests that are older than a predefined period of time are removed from the log. In such cases, the send-side rate limiter 116 determines, for each rate limit, whether a permit is available for a message based on a number of previous messages associated with the rate limit that have been transmitted during the period of time. A permit is only available if the number of previous messages that have been granted a permit during the period of time is less than the predefined number of requests that can be added to the log for the rate limit. In some embodiments, the predefined number of permits per period of time, and the length of the period of time, can be determined based on a rate limit input by a user (e.g., via a user interface) and passed as arguments from the send service 110 to the in-memory database 114 when the send-side rate limiter 116 is called. In such cases, the predefined number of permits per period of time, the length of the period of time, as well as a delivery rate associated with a queue 108, can be updated if the user changes the rate limit. Although described herein primarily with respect to a sliding log technique as a reference example, any technically feasible rate limiting technique, such as a leaky bucket technique, can be used in lieu of the sliding log technique in some embodiments.

If the send-side rate limiter 116 determines that a permit is available, then a permit is acquired for the message. Returning to the example of a sliding log technique, a permit can be acquired by adding a timestamp associated with the request to transmit the message to a list (i.e., the log) for the rate limit. In some embodiments, the timestamp can be passed by the send service 110 to the in-memory database 114 when the send-side rate limiter 116 is called, acquired from a server on which the send-side rate limiter 116 runs, or obtained in any other technically feasible manner. Further, the send-side rate limiter 116 removes timestamps from the list that are older than the period of time. When another request to transmit a message associated with the rate limit is received, the send-side rate limiter 116 checks whether the length of the list for the rate limit is less than the number of allowed permits during the period of time. If the length of the list is less than the number of allowed permits, then a permit is available, indicating that transmission of the message will comply with the rate limit. In some embodiments, when a message is associated with multiple rate limits, the send-side rate limiter 116 attempts to acquire a permit for each rate limit, as discussed in greater detail below in conjunction with FIG. 6. In such cases, the message is only transmitted if a permit can be acquired for each rate limit.

Illustratively, the send-side rate limiter 116 returns a yes or no response to the send service 110 at 308, depending on whether the transmission of a message complies with rate limits associated with the message or not. For messages that the send-side rate limiter 116 returns a yes response, the send service 110 renders those messages and sends the rendered messages to the messaging service provider 118 at 310. Thereafter, the messaging service provider 118 transmits the rendered messages to the appropriate endpoints.

Figure 4:
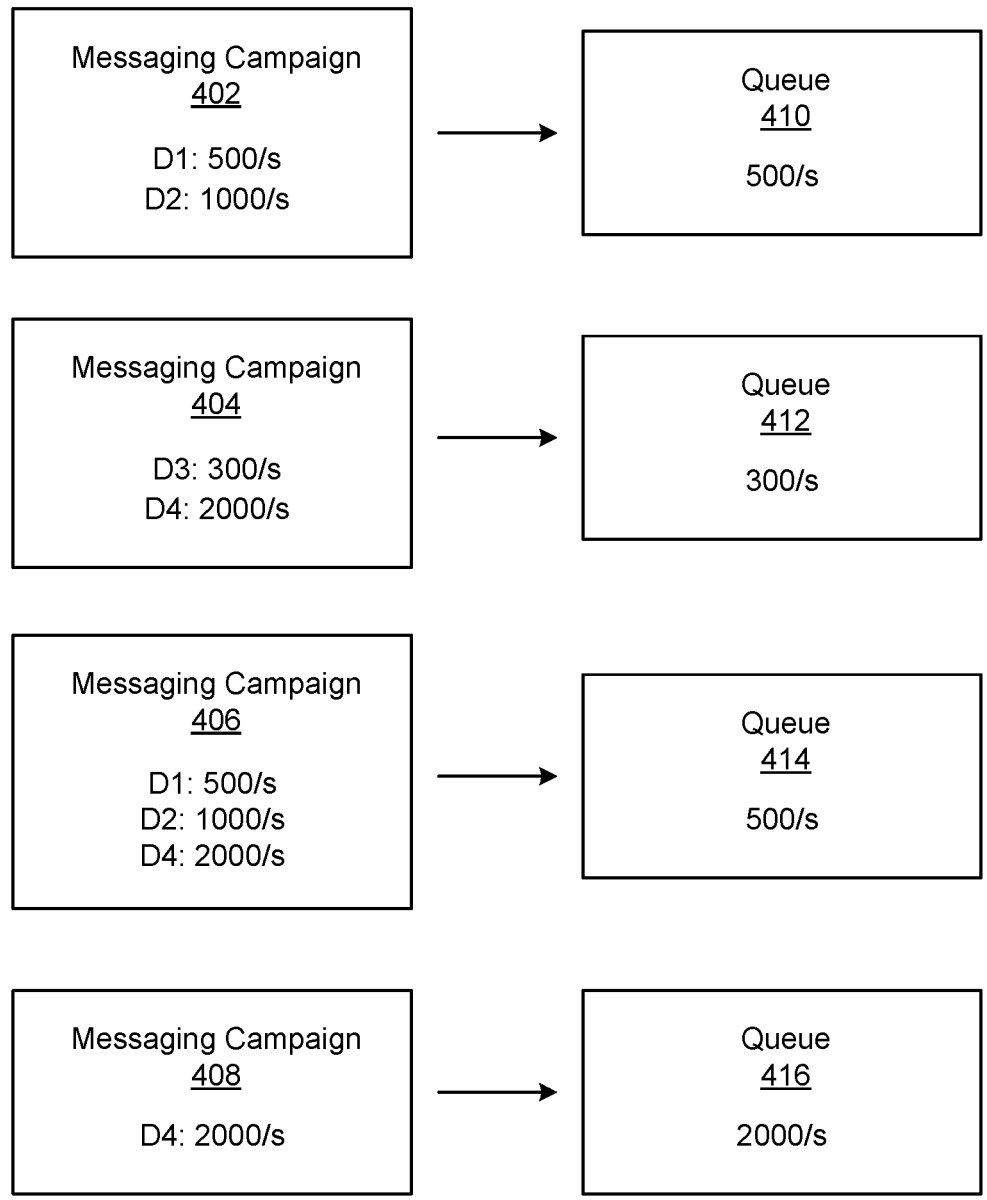
FIG. 4 illustrates how exemplar rate limits are set for queues in a queuing system, according to various embodiments.

FIG. 4 illustrates how exemplar rate limits are set for queues in the queuing system 106, according to various embodiments. As shown, a message campaign 402 uses data feeds D1 and D2 that are associated with rate limits of 500 messages per second and 1000 messages per second, respectively; a message campaign 404 uses data feeds D3 and D4 that are associated with rate limits of 300 messages per second and 2000 messages per second, respectively; a message campaign 406 uses data feeds D1, D2, and D3; and a message campaign 408 uses data feed D4. Although described with respect to data feed rate limits as a reference example, in some embodiments message campaigns can be associated with other types of rate limits, such as rate limits for particular types of messages, rate limits based on customer quotas, and rate limits for the message campaigns, themselves.

As described, in some embodiments, the delivery rate limit for a queue can be set to a lowest rate limit associated with a message campaign. Illustratively, the delivery rate limit for a queue 410 that stores messages for the message campaign 402 can be set to 500 messages per second, the delivery rate limit for a queue 412 that stores messages for the message campaign 404 can be set to 300 messages per second, the delivery rate limit for a queue 414 that stores messages for the message campaign 406 can be set to 500 messages per second, and the delivery rate limit for a queue 416 that stores messages for the message campaign 408 can be set to 2000 messages per second. Although shown as the being set to the lowest rate limits associated with the message campaigns 402, 404, 406, and 408 as an example, in other embodiments, the delivery rate limits for the queues 410, 412, 414, and/or 416 can be set to predefined rate limit(s) that are at least the lowest rate limits It should be noted that the delivery rate limits provide only upper bounds on the rate at which messages are transmitted for each of the message campaigns 402, 404, 406, and 408. The actual rate at which messages are transmitted will generally depend on which of the message campaigns 402, 404, 406, and 408 are running simultaneously.

For example, if the message campaigns 402 and 404 ran simultaneously, then no data feeds would be shared by the message campaign 402 and 404. In such a case, the send-side rate limiter 116 may reject few or no messages, and the actual rate at which messages are transmitted will be similar to, if not the same as, the delivery rate limits for the queues 410 and 412 of 500 messages per second and 300 messages per second, respectively.

As another example, if the message campaigns 402 and 406 ran simultaneously, then data feeds D1 and D2 would be used by both of the message campaigns 402 and 406. In such a case, the rate limit of 500 messages per second associated with data feed D1, which is less than the rate limit of 1000 messages per second associated with data feed D2, is shared between the message campaigns 402 and 406. As a result, messages from the message campaigns 402 and 406 may be transmitted at approximately 250 messages per second. The send-side rate limiter 116 will block about half of the requests to transmit messages for each of the message campaigns 402 and 406, because the 500 message per second rate limit is shared by the two message campaigns 402 and 406.

As another example, if the message campaigns 404, 406, and 408 ran simultaneously, then data feed D4 would be used by all three of the message campaigns 404, 406, and 408. In such a case, the rate limit of 2000 messages per second associated with data feed D4 is shared between the message campaigns 404, 406, and 408. However, the message campaigns 404 and 406 are already limited to 300 messages per second and 500 messages per second, respectively, due to the delivery rate limits that are set to the lowest rate limits associated with the message campaigns 404 and 406, as described above. The remaining 1200 messages per second can be used by the message campaign 408. In practice, the actual limits can depend on (1) the rate at which send service(s) (e.g., the send service 110) consume messages from queues associated with the message campaigns 404, 406, and 408, and (2) the rate at which requests are made to the send-side rate limiter (e.g., send-side rate limiter 116) that handles requests to transmit messages for the message campaign 408. However, the overall rate limit of 2000 messages per second will be respected.

It should be noted that, because the delivery rate limits only represent the highest possible send rate that is allowed, the system 100 can adapt to message campaigns starting and stopping sends at arbitrary times. For example, if a new message campaign starts that shares the same rate limit with other message campaign(s), the send-side rate limiter 116 will simply reject a larger portion of requests, resulting in a larger number of negative acknowledgements to the queuing system 106.

Figure 5:
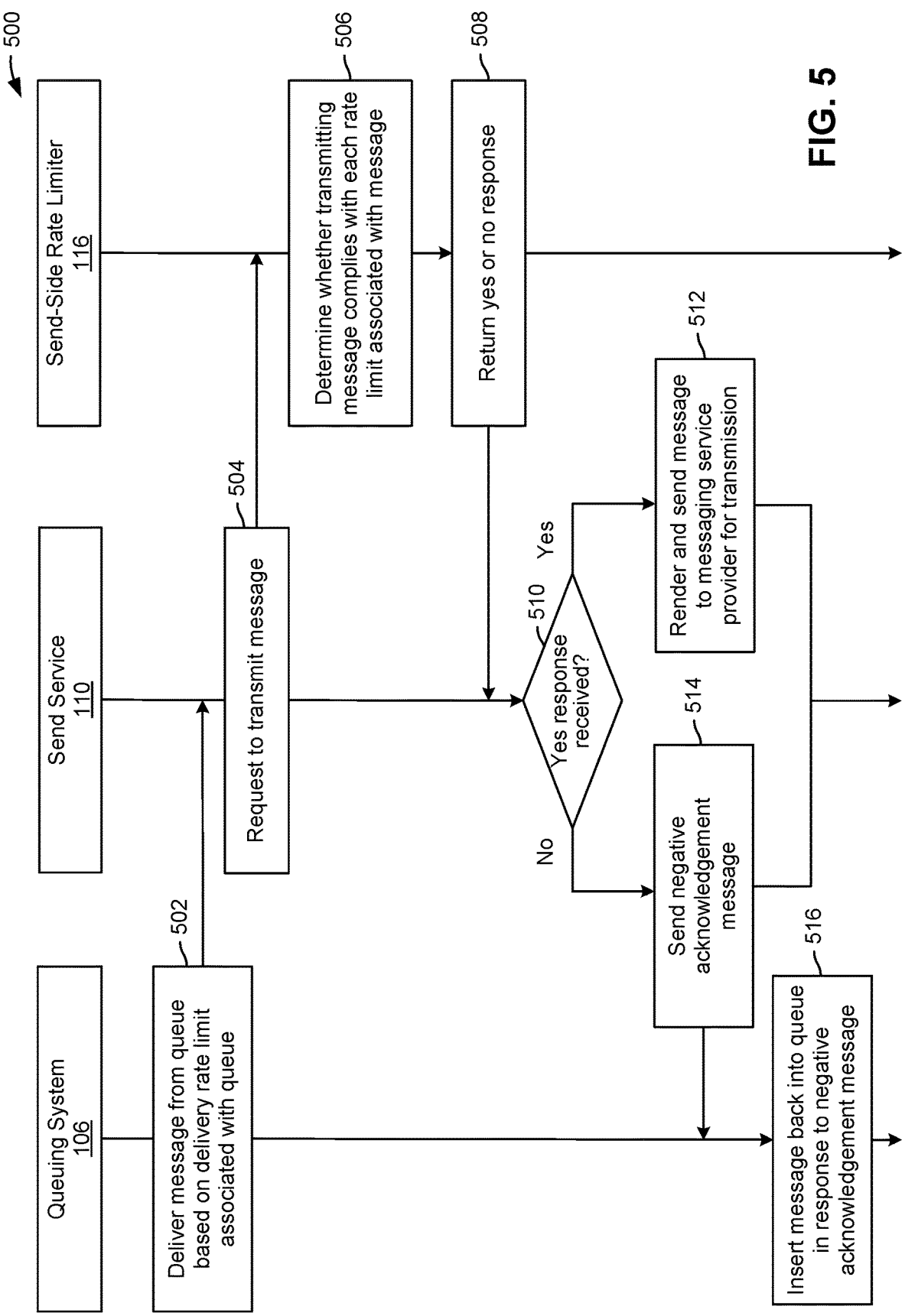
FIG. 5 is a flow diagram of method steps for transmitting a message, according to various embodiments.

FIG. 5 is a flow diagram of method steps for transmitting a message, according to various embodiments. Although the method steps are described in conjunction with the systems of FIGS. 1-2, persons of ordinary skill in the art will understand that any system configured to perform the method steps, in any order, is within the scope of the present disclosure.

As shown, a method 500 begins at step 502, where the queuing system 106 delivers a message from a queue 108 to the send service 110 based on a delivery rate limit associated with that queue 108. As described, in some embodiments, the delivery rate limit is set to a lowest rate limit associated with messages stored in the queue 108. In some other embodiments, the delivery rate limit can be set to a predefined rate limit that is at least the lowest rate limit associated with the messages stored in the queue 108.

At step 504, the send service 110 sends a request to transmit the message to the send-side rate limiter 116. In some embodiments, the send service 110 sends the request by invoking an application programming interface (API) exposed by the send-side rate limiter 116.

At step 506, the send-side rate limiter 116 determines whether transmitting the message complies with each rate limit associated with the message. In some embodiments, the send-side rate limiter 116 implements a sliding log or other rate limiting technique. In the case of the sliding log technique, the send-side rater limiter 116 determines, for each rate limit, whether a permit can be granted based on a number of messages associated with the rate limit that have been transmitted during a period of time, as described above in conjunction with FIG. 3. Only if a permit can be acquired for every rate limit associated with a message does the send-side rate limiter 116 acquire those permits and allow the transmission of the message. Otherwise, the send-side rate limiter 116 rejects the request to transmit the message. As discussed in greater detail below in conjunction with FIG. 6, in a single transaction in the in-memory database 114, the send-side rate limiter 116 can check if permits are available for all of the rate limits associated with the message, and if such is the case, acquire permits for all of those rate limits in some embodiments.

At step 508, the send-side rate limiter 116 returns either a yes or a no response to the send service 110 based on the determination at step 506. A yes response indicates that transmission of the message is permitted because all of the rate limits associated with the message will be complied with. A no response indicates that transmission of the message is rejected because not all of the rate limits associated with the message will be complied with.

At step 510, if the send service 110 receives a yes response from the send-side rate limiter 116, then at step 512, the send service 110 renders the message and sends the rendered message to the messaging service provider 118. In turn, the messaging service provider 118 transmits the rendered message to an appropriate endpoint.

On the other hand, if the send service 110 receives a no response from the send-side rate limiter 116 at step 510, indicating that the message cannot be sent at the current time, then at step 514, the send service 110 sends back a negative acknowledgment message to the queuing system 106. The negative acknowledgment message indicates that the queuing system 106 needs to re-deliver the message to the send service 110 at a later time.

At step 516, in response to receiving the negative acknowledgment message, the queuing system 106 inserts the message back into the queue 108. In some embodiments, the message can be reinserted at or near the front of the queue 108. The queuing system 106 can then re-deliver the message to the send service 110 at a later time, such as with a next batch of messages or after a predefined period of time (e.g., a few seconds).

Figure 6:
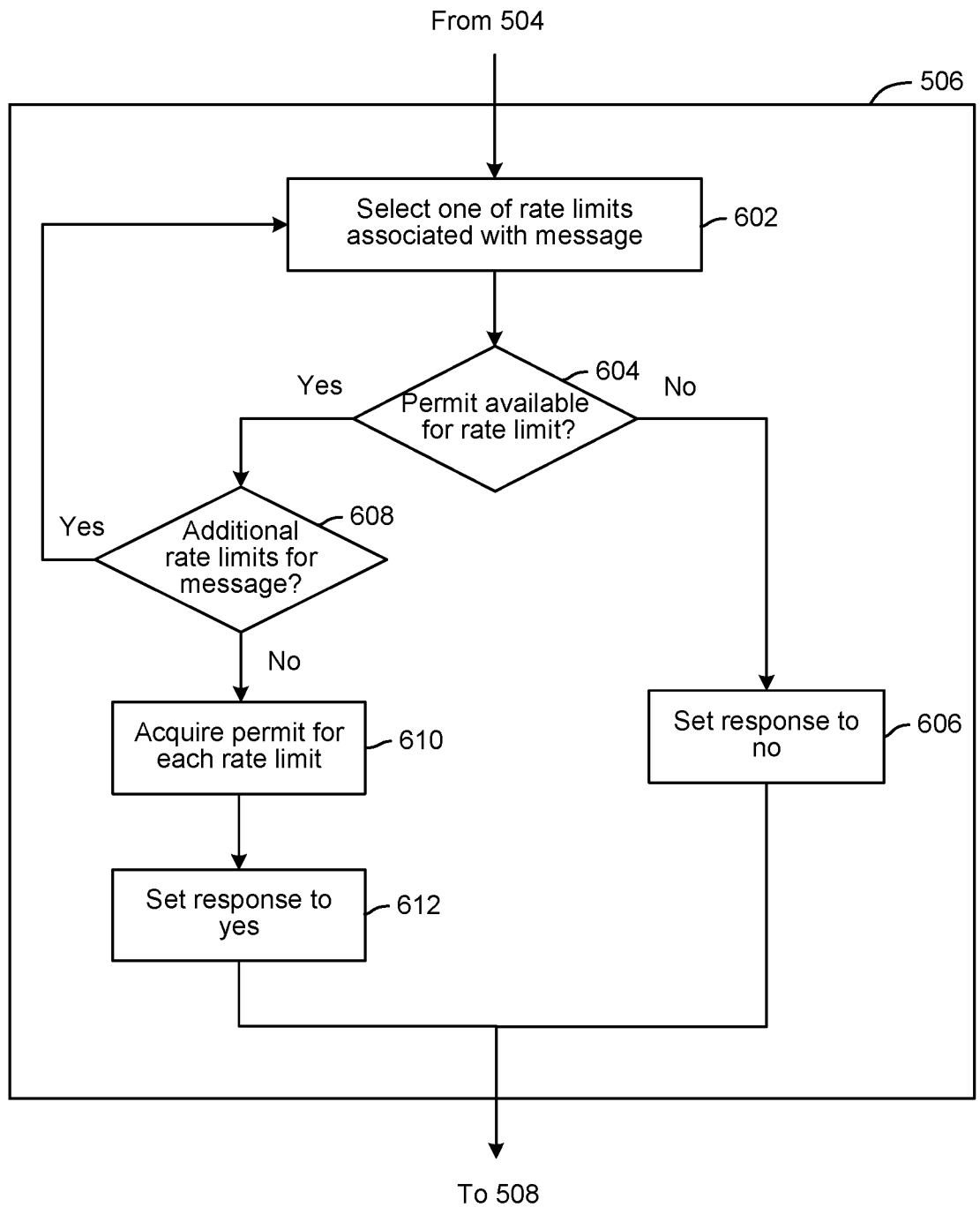
FIG. 6 is a flow diagram of method steps for determining whether the transmission of a message complies with rate limits associated with that message, according to various embodiments.

FIG. 6 is a flow diagram of method steps for determining whether the transmission of a message complies with rate limits associated with that message at step 506, according to various embodiments. Although the method steps are described in conjunction with the systems of FIGS. 1-2, persons of ordinary skill in the art will understand that any system configured to perform the method steps, in any order, is within the scope of the present disclosure. In some embodiments, method steps 602-612 can be performed in a single transition in an in-memory database (e.g., in-memory database 114).

As shown, at step 602, the send-side rate limiter 116 selects one of the rate limits associated with the message. As described, the message can be one of a number of messages in a message campaign that is associated with multiple rate limits.

At step 604, the send-side rate limiter 116 determines whether a permit is available for the rate limit. As described above in conjunction with FIG. 3, in some embodiments, the send-side rate limiter 116 implements a sliding log or other rate limiting technique. In the case of the sliding log technique, the send-side rate limiter 116 adds a request to a log when the log includes fewer than a predefined number of requests, and logged requests that are older than a predefined period of time are removed from the log. In such cases, the send-side rate limiter 116 determines, at step 604, whether a permit is available based on a number of messages associated with the rate limit that have been transmitted during the predefined period of time. If a permit is available, then the permit can be acquired for a message by, e.g., adding a timestamp of a request associated with the message to a list (i.e., the log) for the rate limit. In addition, the send-side rate limiter 116 removes timestamps from the list that are older than the period of time. When another request to transmit a message associated with the rate limit is received, such as the request from the send service 110 at step 504, the send-side rate limiter 116 checks whether the length of the list for the rate limit is less than the number of allowed permits during the period of time. A permit is available for the rate limit only if the length of the list for the rate limit is less than the number of allowed permits during the period of time.

If the send-side rate limiter 116 determines that a permit is not available for the rate limit, then at step 606, the send-side rate limiter 116 sets the response to the send service 110 to no. As described, a no response indicates that transmission of the message is rejected because not all of the rate limits associated with the message will be complied with.

On the other hand, if a permit is available for the rate limit, then the method 600 continues to step 608. At step 608, if there are additional rate limits associated with the message, the method 500 returns to step 602, where the send-side rate limiter 116 selects another one of the rate limits associated with the message.

On the other hand, if there are no other rate limits associated with the message, then the method 500 continues to step 610, where the send-side rate limiter 116 acquires a permit for each rate limit. That is, if permits are available for all of the rate limits associated with the message, then the send-side rate limiter 116 acquires such permits. In some embodiments, acquiring a permit for a rate limit can include adding a timestamp of the request from the send service 110 to a list for the rate limit.

At step 612, the send-side rate limiter 116 sets the response to the send service 110 to yes. As described, a yes response indicates that transmission of the message is permitted because all of the rate limits associated with the message will be complied with.

In sum, techniques are disclosed for transmitting electronic messages subject to multiple rate limits. In some embodiments, a send-side rate limiter employs a sliding log or other rate limiting technique to determine whether requests to transmit messages comply with rate limits associated with those messages. When the transmission of a message does not comply with associated rate limits, a negative acknowledgment message is sent to a queuing system, causing the message to be reinserted into a queue for later transmission. In addition, delivery rate limits are established for each queue in the queuing system to throttle the delivery of messages to a send service that makes requests to transmit messages to the send-side rate limiter.

One advantage of the techniques disclosed herein is that the disclosed techniques throttle the transmission of electronic messages based on multiple rate limits that can be applicable to different subsets of message campaigns. The disclosed techniques do not excessively limit the rate at which messages are transmitted. As a result, computing resources are utilized relatively efficiently for transmitting messages. In addition, the disclosed techniques establish delivery rate limits for message queues in a queuing system to avoid overwhelming both a send-side rate limiter that determines whether the transmission of messages complies with rate limits associated with those messages and the queuing system, itself. These technical advantages represent one or more technological improvements over prior art approaches.

1. In some embodiments, a computer-implemented method for transmitting messages comprises storing a plurality of messages in a queue, retrieving, based on a rate limit associated with the queue, one or more messages included in the plurality of messages from the queue, and transmitting the one or more messages based on a plurality of rate limits associated with the one or more messages.
2. The computer-implemented method of clause 1, wherein the rate limit associated with the queue is set to a smallest of the plurality of rate limits.
3. The computer-implemented method of clauses 1 or 2, wherein the rate limit associated with the queue is set to a predefined rate limit.
4. The computer-implemented method of any of clauses 1-3, wherein transmitting the one or more messages based on the plurality of rate limits comprises, for each message included in the one or more messages determining whether transmitting the message complies with the plurality of rate limits, if transmitting the message complies with the plurality of rate limits, transmitting the message, and if transmitting the message does not comply with the plurality of rate limits, causing the message to be inserted back into the queue.
5. The computer-implemented method of any of clauses 1-4, wherein determining whether transmitting the message complies with the plurality of rate limits comprises, for each rate limit included in the plurality of rate limits, acquiring a permit that can be granted when a predefined number of permits have not been granted during a predefined period of time.
6. The computer-implemented method of any of clauses 1-5, wherein the plurality of rate limits include at least one of a rate limit associated with a data feed, a rate limit associated with a type of the one or more messages, a rate limit associated with a customer quota, or a rate limit associated with a message campaign.

7. The computer-implemented method of any of clauses 1-6, further comprising storing a plurality of messages in another queue, retrieving one or more messages from the other queue based on a rate limit associated with the other queue, and transmitting the one or more messages that are retrieved from the other queue based on another plurality of rate limits.
8. The computer-implemented method of any of clauses 1-7, wherein the plurality of rate limits and the other plurality of rate limits include at least one same rate limit.
9. The computer-implemented method of any of clauses 1-8, wherein the rate limit associated with the queue is implemented via a queuing system and the plurality of rate limits are implemented via a script.
10. In some embodiments, one or more non-transitory computer-readable storage media include instructions that, when executed by at least one processor, cause the at least one processor to perform steps for transmitting messages, the steps comprising storing a plurality of messages in a queue, retrieving, based on a rate limit associated with the queue, one or more messages included in the plurality of messages from the queue, and transmitting the one or more messages based on a plurality of rate limits associated with the one or more messages.
11. The one or more non-transitory computer-readable storage media of clause 10, wherein the rate limit associated with the queue is set to a smallest of the plurality of rate limits.
12. The one or more non-transitory computer-readable storage media of clauses 10 or 11, wherein the rate limit associated with the queue is set to a predefined rate limit.
13. The one or more non-transitory computer-readable storage media of any of clauses 10-12, wherein transmitting the one or more messages based on the plurality of rate limits comprises, for each message included in the one or more messages determining whether transmitting the message complies with the plurality of rate limits, if transmitting the message complies with the plurality of rate limits, transmitting the message, and if transmitting the message does not comply with the plurality of rate limits, causing the message to be inserted back into the queue.
14. The one or more non-transitory computer-readable storage media of any of clauses 10-13, wherein determining whether transmitting the message complies with the plurality of rate limits comprises, for each rate limit included in the plurality of rate limits, acquiring a permit that can be granted when a predefined number of permits have not been granted during a predefined period of time.
15. The one or more non-transitory computer-readable storage media of any of clauses 10-14, wherein the plurality of rate limits include at least one of a rate limit associated with a data feed, a rate limit associated with a type of the one or more messages, a rate limit associated with a customer quota, or a rate limit associated with a message campaign.
16. The one or more non-transitory computer-readable storage media of any of clauses 10-15, wherein the instructions, when executed by at the least one processor, further cause the at least one processor to perform steps comprising storing a plurality of messages in another queue, retrieving one or more messages from the other queue based on a rate limit associated with the other queue, and transmitting the one or more messages that are retrieved from the other queue based on another plurality of rate limits.
17. The one or more non-transitory computer-readable storage media of any of clauses 10-16, wherein the one or more messages are transmitted as one or more emails, text messages, in-application notifications, push notifications, or web push notifications.
18. The one or more non-transitory computer-readable storage media of any of clauses 10-17, wherein the instructions, when executed by the at least one processor, further cause the at least one processor to perform steps comprising updating at least one of the rate limit associated with the queue or the plurality of rate limits.
19. In some embodiments, a system comprises one or more memories storing instructions, and one or more processors that are coupled to the one or more memories and, when executing the instructions, are configured to store a plurality of messages in a queue, retrieve, based on a rate limit associated with the queue, one or more messages included in the plurality of messages from the queue, and transmit the one or more messages based on a plurality of rate limits associated with the one or more messages.
20. The system of clause 19, wherein the rate limit associated with the queue is set to a smallest of the plurality of rate limits.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for transmitting messages, the method comprising:
    storing a first plurality of messages in a queue;
    retrieving, based on a first rate limit associated with the queue, one or more messages included in the first plurality of messages from the queue;
    for each message included in the one or more messages:
        matching a first plurality of attributes associated with the message to a first plurality of rate limits; and
        transmitting the message based on the first plurality of rate limits.

2. The computer-implemented method of claim 1, further comprising:
    determining a second plurality of rate limits associated with a second plurality of attributes associated with the first plurality of messages in the queue; and
    setting the first rate limit to a smallest rate limit included in the second plurality of rate limits.

3. The computer-implemented method of claim 1, wherein the first rate limit is set to a predefined rate limit.

4. The computer-implemented method of claim 1, wherein transmitting the message comprises:
    determining whether transmitting the message complies with the first plurality of rate limits;
    if transmitting the message complies with the first plurality of rate limits, transmitting the message; and
    if transmitting the message does not comply with the first plurality of rate limits, causing the message to be inserted back into the queue.

5. The computer-implemented method of claim 4, wherein determining whether transmitting the message complies with the first plurality of rate limits comprises, for each rate limit included in the first plurality of rate limits, acquiring a permit based on a number of previous messages associated with the first rate limit that have been transmitted during a predefined period of time.

6. The computer-implemented method of claim 1, wherein the first plurality of attributes comprises at least one of a data feed that provides information to include in the message, a type of the message, a customer quota associated with the message, or a message campaign that includes the message.

7. The computer-implemented method of claim 1, further comprising:
    storing a second plurality of messages in another queue;
    retrieving one or more additional messages from the other queue based on a second rate limit associated with the other queue; and
    transmitting the one or more additional messages based on second plurality of rate limits.

8. The computer-implemented method of claim 7, wherein the first plurality of rate limits and the second plurality of rate limits include at least one same rate limit.

9. The computer-implemented method of claim 1, wherein the first rate limit is implemented via a queuing system and the first plurality of rate limits are implemented via a script.

10. One or more non-transitory computer-readable storage media including instructions that, when executed by at least one processor, cause the at least one processor to perform steps for transmitting messages, the steps comprising:
    storing a plurality of messages in a queue;
    retrieving, based on a first rate limit associated with the queue, one or more messages included in the plurality of messages from the queue;
    for each message included in the one or more messages:
        matching a first plurality of attributes associated with the message to a first plurality of rate limits; and
        transmitting the message based on the first plurality of rate limits.

11. The one or more non-transitory computer-readable storage media of claim 10, wherein the steps further comprise:
    determining a second plurality of rate limits associated with a second plurality of attributes associated with the plurality of messages in the queue; and
    setting the first rate limit to a smallest rate limit included in the second plurality of rate limits.

12. The one or more non-transitory computer-readable storage media of claim 10, wherein the first rate limit is set to a predefined rate limit.

13. The one or more non-transitory computer-readable storage media of claim 10, wherein transmitting the message comprises:

determining whether transmitting the message complies with the first plurality of rate limits;

if transmitting the message complies with the first plurality of rate limits, transmitting the message; and if transmitting the message does not comply with the first plurality of rate limits, causing the message to be inserted back into the queue.

14. The one or more non-transitory computer-readable storage media of claim 13, wherein determining whether transmitting the message complies with the first plurality of rate limits comprises, for each rate limit included in the first plurality of rate limits, acquiring a permit based on a number of previous messages associated with the first rate limit that have been transmitted during a predefined period of time.

15. The one or more non-transitory computer-readable storage media of claim 10, wherein the first plurality of rate limits include at least one of a rate limit associated with a data feed that provides information to include in the message, a rate limit associated with a type of the one or more messages, a rate limit associated with a customer quota, or a rate limit associated with a message campaign.

16. The one or more non-transitory computer-readable storage media of claim 10, wherein the instructions, when executed by at the least one processor, further cause the at least one processor to perform steps comprising:

storing a second plurality of messages in another queue;

retrieving one or more additional messages from the other queue based on a second rate limit associated with the other queue; and transmitting the one or more additional messages based on second plurality of rate limits.

17. The one or more non-transitory computer-readable storage media of claim 10, wherein the one or more messages are transmitted as one or more emails, text messages, in-application notifications, push notifications, or web push notifications.

18. The one or more non-transitory computer-readable storage media of claim 10, wherein the instructions, when executed by the at least one processor, further cause the at least one processor to perform steps comprising:

updating at least one of the first rate limit associated with the queue or the first plurality of rate limits.

19. A system, comprising:

one or more memories storing instructions; and one or more processors that are coupled to the one or more memories and, when executing the instructions, are configured to:

store a plurality of messages in a queue, retrieve, based on a first rate limit associated with the queue, one or more messages included in the plurality of messages from the queue, for each message included in the one or more messages:

match a first plurality of attributes associated with the message to a first plurality of rate limits; and transmit the message based on the first plurality of rate limits.

20. The system of claim 19, wherein, when executing the instructions, the one or more processors are further configured to:

determine a second plurality of rate limits associated with a second plurality of attributes associated with the plurality of messages in the queue; and set the first rate limit to a smallest rate limit included in the second plurality of rate limits.

* * * * *